(12) United States Patent
Benny et al.

(10) Patent No.: US 9,116,727 B2
(45) Date of Patent: Aug. 25, 2015

(54) SCALABLE NETWORK OVERLAY VIRTUALIZATION USING CONVENTIONAL VIRTUAL SWITCHES

(71) Applicant: Lenovo Enterprise Solutions (Singapore) Pte. Ltd., Singapore (SG)

(72) Inventors: Stephan Benny, San Jose, CA (US); Vinit Jain, Austin, TX (US); Jayakrishna Kidambi, San Jose, CA (US); Nilanjan Mukherjee, Santa Clara, CA (US); Vijoy A. Pandey, San Jose, CA (US); Santosh Rajagopalan, San Jose, CA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 192 days.

(21) Appl. No.: 13/742,274

(22) Filed: Jan. 15, 2013

(65) Prior Publication Data

US 2014/0201733 A1 Jul. 17, 2014

(51) Int. Cl.
*H04L 29/12* (2006.01)
*G06F 9/455* (2006.01)
*H04L 12/931* (2013.01)
*H04L 12/18* (2006.01)
*H04L 12/46* (2006.01)

(52) U.S. Cl.
CPC ............ *G06F 9/455* (2013.01); *G06F 9/45558* (2013.01); *H04L 61/6022* (2013.01); *G06F 2009/45595* (2013.01); *H04L 12/185* (2013.01); *H04L 12/4641* (2013.01); *H04L 49/70* (2013.01)

(58) Field of Classification Search
USPC ....................................... 370/390
See application file for complete search history.

(56) References Cited

U.S. PATENT DOCUMENTS

| | | | |
|---|---|---|---|
| 7,047,314 B2 | 5/2006 | Sato et al. | |
| 7,508,775 B2 | 3/2009 | Ackermann-Markes et al. | |
| 7,693,158 B1 | 4/2010 | Carrie | |
| 7,860,092 B2 | 12/2010 | Yoon et al. | |

(Continued)

FOREIGN PATENT DOCUMENTS

| | | |
|---|---|---|
| CN | 102801599 | 11/2012 |
| JP | 2013003935 | 1/2013 |
| WO | WO2012166139 | 12/2012 |

OTHER PUBLICATIONS

Li et al., "VSITE: A scalable and secure architecture for seamless L2 enterprise extension in the cloud," 2010 IEEE, pp. 31-36.

(Continued)

*Primary Examiner* — Michael Thier
*Assistant Examiner* — Yaotang Wang
(74) *Attorney, Agent, or Firm* — Zilka-Kotab, PC

(57) ABSTRACT

In one embodiment, a system includes a server running a virtualization platform, the virtualization platform including logic adapted for creating one or more virtual machines (VMs) and logic adapted for managing a virtual switch (vSwitch), a controller in communication with the server, the controller including logic adapted for assigning a media access control (MAC) address and a virtual local area network (VLAN) identifier (ID) to each of the one or more VMs, wherein a specific tenant to which the one or more VMs belongs is indicated using a tenant ID derived from the VLAN ID, the MAC address, or a combination thereof. Other systems, methods, and computer program products are also described according to more embodiments.

23 Claims, 10 Drawing Sheets

(56) References Cited

U.S. PATENT DOCUMENTS

| | | | |
|---|---|---|---|
| 7,983,257 | B2 | 7/2011 | Chavan et al. |
| 7,986,649 | B2 | 7/2011 | Zheng |
| 2005/0182853 | A1 | 8/2005 | Lewites et al. |
| 2008/0205264 | A1 | 8/2008 | Rorie |
| 2008/0253373 | A1 | 10/2008 | Ros-Giralt et al. |
| 2009/0037607 | A1 | 2/2009 | Farinacci et al. |
| 2010/0061385 | A1 | 3/2010 | Welin et al. |
| 2010/0226368 | A1 | 9/2010 | Mack-Crane et al. |
| 2011/0202920 | A1* | 8/2011 | Takase ............................... 718/1 |
| 2011/0299531 | A1 | 12/2011 | Yu et al. |
| 2011/0299534 | A1* | 12/2011 | Koganti et al. ............... 370/392 |
| 2011/0317703 | A1 | 12/2011 | Dunbar et al. |
| 2012/0014386 | A1 | 1/2012 | Xiong et al. |
| 2012/0016970 | A1 | 1/2012 | Shah et al. |
| 2012/0307826 | A1* | 12/2012 | Matsuoka ..................... 370/390 |
| 2013/0163594 | A1 | 6/2013 | Sharma et al. |
| 2013/0238802 | A1 | 9/2013 | Sarikaya |
| 2013/0250951 | A1 | 9/2013 | Koganti |
| 2013/0318219 | A1 | 11/2013 | Kancherla |
| 2013/0322443 | A1 | 12/2013 | Dunbar et al. |
| 2013/0343385 | A1 | 12/2013 | Benny et al. |
| 2014/0025821 | A1* | 1/2014 | Baphna et al. ................ 709/226 |
| 2014/0056302 | A1 | 2/2014 | Benny et al. |
| 2014/0098813 | A1* | 4/2014 | Mishra et al. .................. 370/390 |
| 2014/0185616 | A1* | 7/2014 | Bloch et al. .................... 370/392 |
| 2014/0192804 | A1* | 7/2014 | Ghanwani et al. ............. 370/390 |

OTHER PUBLICATIONS

International Search Report and Written Opinion from PCT Application No. PCT/IB2013/060812 dated May 16, 2014.
U.S. Appl. No. 13/528,751, filed Jun. 20, 2012.
Final Office Action from U.S. Appl. No. 13/528,751 dated May 14, 2014.
Non-Final Office Action from U.S. Appl. No. 13/528,751 dated Nov. 22, 2013.
Notice of Allowance from U.S. Appl. No. 13/528,751, dated Sep. 17, 2014.
Benny et al., U.S. Appl. No. 14/066,492, filed Oct. 29, 2013.
Notification of the Recording of a Change from PCT Application No. PCT/IB2013/060812, dated Feb. 5, 2015.
Notification of the Recording of a Change from PCT Application No. PCT/IB2013/060812, dated Feb. 6, 2015.
Notification Concerning Availability of the Publication of the International Application No. PCT/IB2013/060812, dated Jul. 24, 2014.
Non-Final Office Action from U.S. Appl. No. 14/066,492, dated May 6, 2015.

* cited by examiner

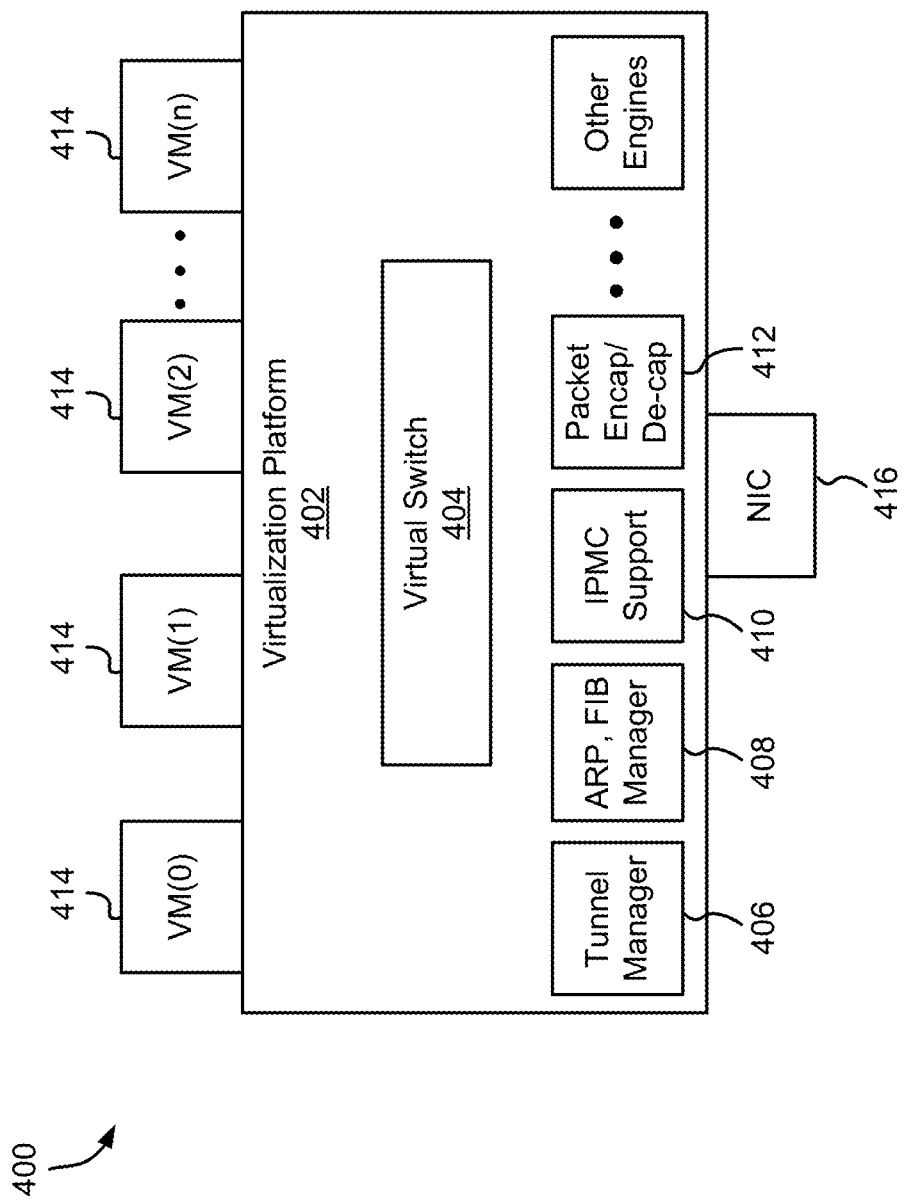

SCALABLE NETWORK OVERLAY VIRTUALIZATION USING CONVENTIONAL VIRTUAL SWITCHES

BACKGROUND

The present invention relates to data center infrastructure, and more particularly, this invention relates to providing overlay functionality using conventional virtual switches (vSwitches).

Network virtualization is an emerging data center and cloud computing trend which aims to virtualize a network as seen by end stations in a way that greatly simplifies network provisioning in multi-tenant environments, as well as traditional environments. One of the more common techniques of achieving network virtualization is to use network overlays, where tunnels are established between edge network switches to which end stations, e.g., Virtual Machines (VMs), connect. The tunnel is typically implemented by encapsulating packets transmitted by a source end station into an overlay header that transports the packet from the source switch to a target switch via an internet protocol (IP)-based network (media access control (MAC)-in-IP), or an Ethernet network (MAC-in-MAC). The overlay header includes an identifier (ID) that uniquely identifies the virtual network. The target switch (tunnel end point) strips off the overlay header encapsulation and delivers the original packet to the destination end station via conventional network connections. In addition to this tunneling mechanism, the edge switches participate in an address discovery protocol, which may be learning/flooding based, or lookup-based. Internet Engineering Task Force (IETF) proposals, such as Virtual eXtensible Local Area Network (VXLAN) and Network Virtualization using Generic Routing Encapsulation (NVGRE), propose some network virtualization frame formats and protocols. All current proposals use a 24-bit virtual network identifier (VNID) that is double the size of the 12-bit Virtual Local Area Network (VLAN) ID used in traditional networks. This effectively removes the 4K limit that is imposed if VLANs are used for rudimentary network virtualization (as has been attempted by several solution providers recently).

An overlay network may be implemented using a number of VMs with a virtualization platform controlling the processing of networking packets in and out of each VM and one or more VMs may be associated with the overlay network. A virtualization platform processes the networking traffic associated with each overlay network and/or VM using predefined properties and policies for the corresponding overlay network and/or VM. As the number of overlay networks increases, so does the processing load requirements of the virtualization platform.

Existing network virtualization solutions in the industry are based on modifying the vSwitches within the virtualization platform. These solutions have several disadvantages, such as cost (e.g., this functionality often demands the most expensive license), interoperability issues due to virtualization platform dependency (e.g., different virtualization platforms deploy different techniques to achieve network virtualization, and this means these solutions do not interoperate with each other unless some sort of "translation gateways" are used, and this introduces inefficiencies in the data path), and resource requirements (if implemented within virtualization platforms, these mechanisms take up valuable processor cycles, especially on older hardware that does not support offloads for tunneled packets). Some solutions to this problem either require changes to the virtualization platforms (e.g., implementing the tunnel end point operation in software), or are limited in scale (e.g., only allow approximately 4000 VMs instead of approximately 16 million supported by current overlay solutions implemented on virtualization platforms).

Accordingly, it would be beneficial to have a solution which supports more than 4000 VMs while not requiring changes to existing virtual switches.

SUMMARY

In one embodiment, a system includes a server running a virtualization platform, the virtualization platform including logic adapted for creating one or more virtual machines (VMs) and logic adapted for managing a virtual switch (vSwitch), a controller in communication with the server, the controller including logic adapted for assigning a media access control (MAC) address and a virtual local area network (VLAN) identifier (ID) to each of the one or more VMs, wherein a specific tenant to which the one or more VMs belongs is indicated using a tenant ID derived from the VLAN ID, the MAC address, or a combination thereof.

In another embodiment, a method for providing overlay functionality to a server includes creating one or more VMs on a server running a virtualization platform, the server being in communication with a network and a controller, assigning a MAC address and a VLAN ID to each of the one or more VMs, wherein a specific tenant to which the one or more VMs belongs is indicated using a tenant ID derived from the VLAN ID, the MAC address, or a combination thereof.

In yet another embodiment, a computer program product for providing overlay functionality to a server includes a computer readable storage medium having computer readable program code embodied therewith, the computer readable program code including computer readable program code configured for creating one or more VMs on a server running a virtualization platform, the server being in communication with a network and a controller and computer readable program code configured for assigning a MAC address and a VLAN ID to each of the one or more VMs, wherein a specific tenant to which the one or more VMs belongs is indicated using a tenant ID derived from the VLAN ID, the MAC address, or a combination thereof.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 4A shows an overlay-capable server, according to one approach.

DETAILED DESCRIPTION

Figure 1:
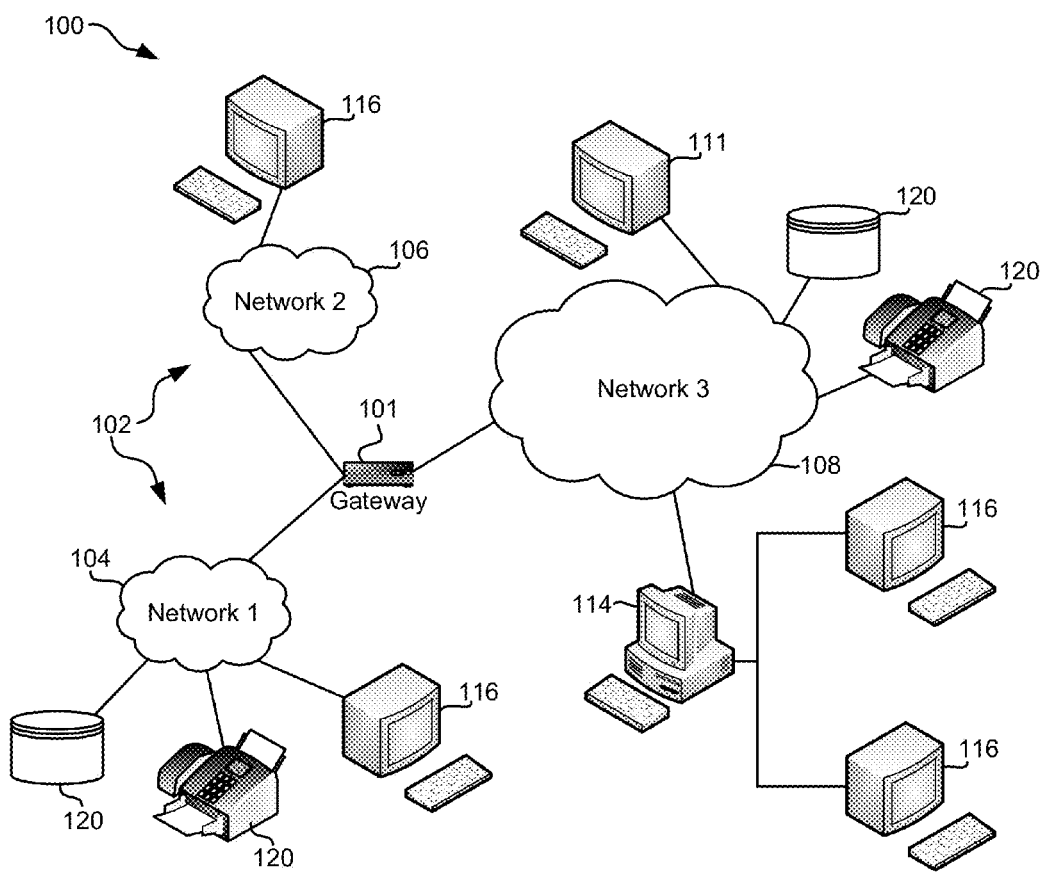
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

According to various embodiments, a portion of a source media access control (MAC) address, a virtual local area network (VLAN) identifier (ID), or a combination thereof, such as an organizational unique identifier (OUI) field in an Ethernet header of a packet, may be used as a tenant ID, which may then be used by a physical switch located at an edge of a network, such as a top of rack (ToR) switch, an embedded blade switch, etc., to implement tunnel end point (TEP) functionality to be used for network overlay. Although some OUIs may be reserved and unusable, the number of usable OUIs is still in the order of a plurality of millions, much larger than the approximately 4000 (4096) limit imposed by VLANs, and much closer to the 16 million tenant identifiers (IDs) achieved by VXLAN and NVGRE.

In one general embodiment, a system includes a server running a virtualization platform, the virtualization platform including logic adapted for creating one or more virtual machines (VMs) and logic adapted for managing a virtual switch (vSwitch), a controller in communication with the server, the controller including logic adapted for assigning a MAC address and a VLAN ID to each of the one or more VMs, wherein a specific tenant to which the one or more VMs belongs is indicated using a tenant ID derived from the VLAN ID, the MAC address, or a combination thereof.

In another general embodiment, a method for providing overlay functionality to a server includes creating one or more VMs on a server running a virtualization platform, the server being in communication with a network and a controller, assigning a MAC address and a VLAN ID to each of the one or more VMs, wherein a specific tenant to which the one or more VMs belongs is indicated using a tenant ID derived from the VLAN ID, the MAC address, or a combination thereof.

In yet another general embodiment, a computer program product for providing overlay functionality to a server includes a computer readable storage medium having computer readable program code embodied therewith, the computer readable program code including computer readable program code configured for creating one or more VMs on a server running a virtualization platform, the server being in communication with a network and a controller and computer readable program code configured for assigning a MAC address and a VLAN ID to each of the one or more VMs, wherein a specific tenant to which the one or more VMs belongs is indicated using a tenant ID derived from the VLAN ID, the MAC address, or a combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
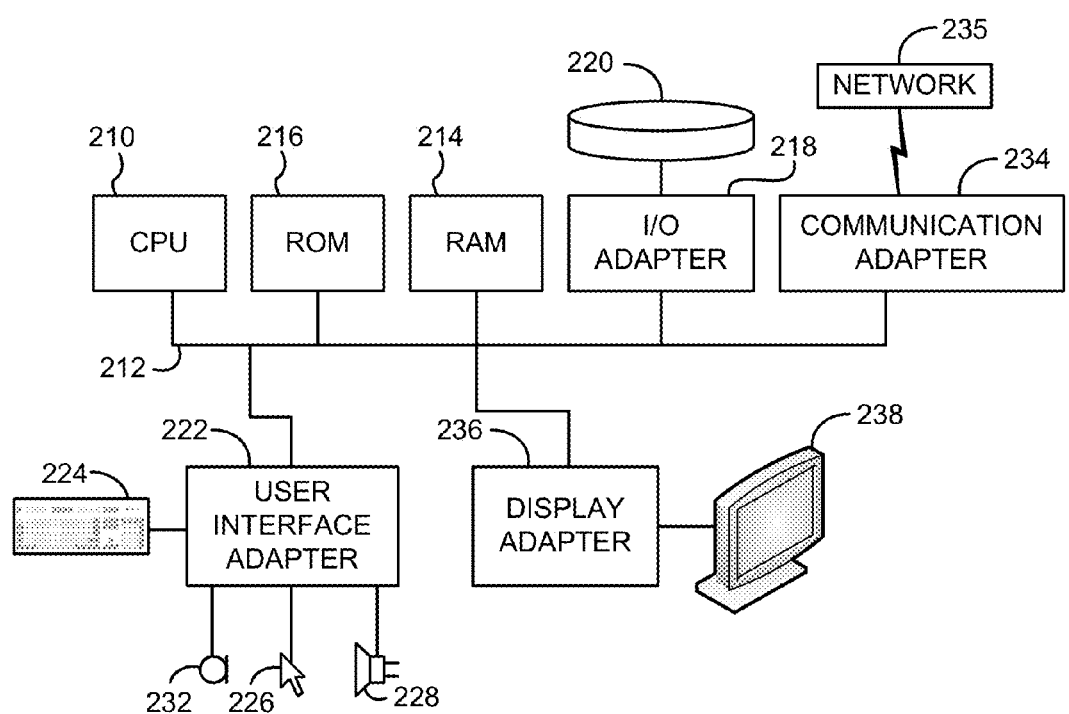
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
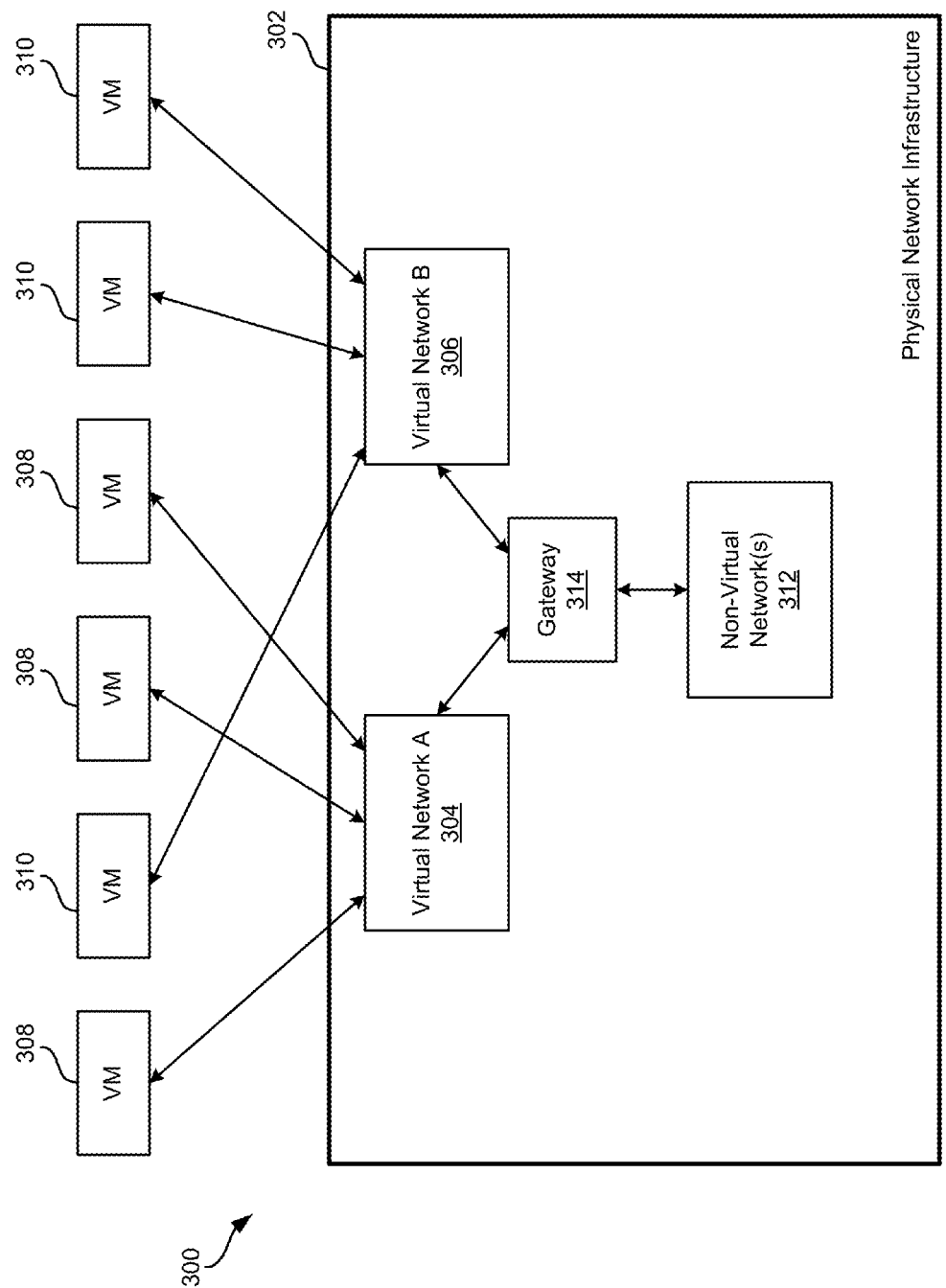
FIG. 3 is a simplified diagram of a virtualized data center, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. In other embodiments, VMs 308, 310 or other physical devices may be connected to either Virtual Network A 304 or Virtual Network B 306, as would be understood by one of skill in the art, and make use of the advantages and resources afforded to the devices by the virtual networks. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

Components of an overlay network 300 typically identify where to route packets based on a virtual network identifier, referred to as a VNI or VNID. This is typically a 24-bit code or number, which excludes 0x0 and 0xFFFFFF. The overlay network 300 has the capability of tunneling Layer-2 (L2) packets over the Layer-3 (L3) network by encapsulating the L2 packets into an overlay header also referred to as virtual tunnel end point (VTEP) management. This may be performed using virtual extensible local area network (VXLAN) or some other overlay capable protocol, such as locator/ID separation protocol (LISP), overlay transport virtualization (OTV), Network Virtualization using Generic Routing Encapsulation (NVGRE), etc.

The packet may also be encapsulated in a user datagram protocol (UDP) and internet protocol (IP) UDP/IP header. The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, virtualization platforms, switches capable of overlay functionality, etc.

In order for a device to manage a tunnel, there needs to be a mapping between an original packet's source address, destination address, and a tunnel identifier. In this way, a physical server is capable of forwarding the encapsulated original packet to the proper destination device.

With reference to FIG. 4A, a server 400 is shown according to one approach. As shown, the server 400 includes a virtualization platform 402 which provides and manages a virtual switch 404. To provide overlay functionality to the server 400, the virtualization platform 402 also interacts with a plurality of discrete software engines, such as a tunnel manager 406, an ARP and forwarding information base (FIB) manager 408, an engine for providing internet protocol multicast (IPMC) support 410, a packet encapsulation and de-capsulation engine 412, and any other overlay-enhancing software engines as known in the art. The virtualization platform 402 also provides support for any number of VMs 414, shown in FIG. 4A as VM 0, VM 1, VM 2, . . . , VM n. The VMs 414 may be arranged in one or more virtual networks (each virtual network may have a different virtual network identifier (VNID), indicated as VNID 1, VNID 2, VNID 3, etc., in FIG. 4A). The number and arrangement of the VMs 414 in the exemplary virtual networks is not meant to be limiting on what configurations are possible, as the Figures only show exemplary arrangements of VMs 414 and virtual networks.

Figure 4B:
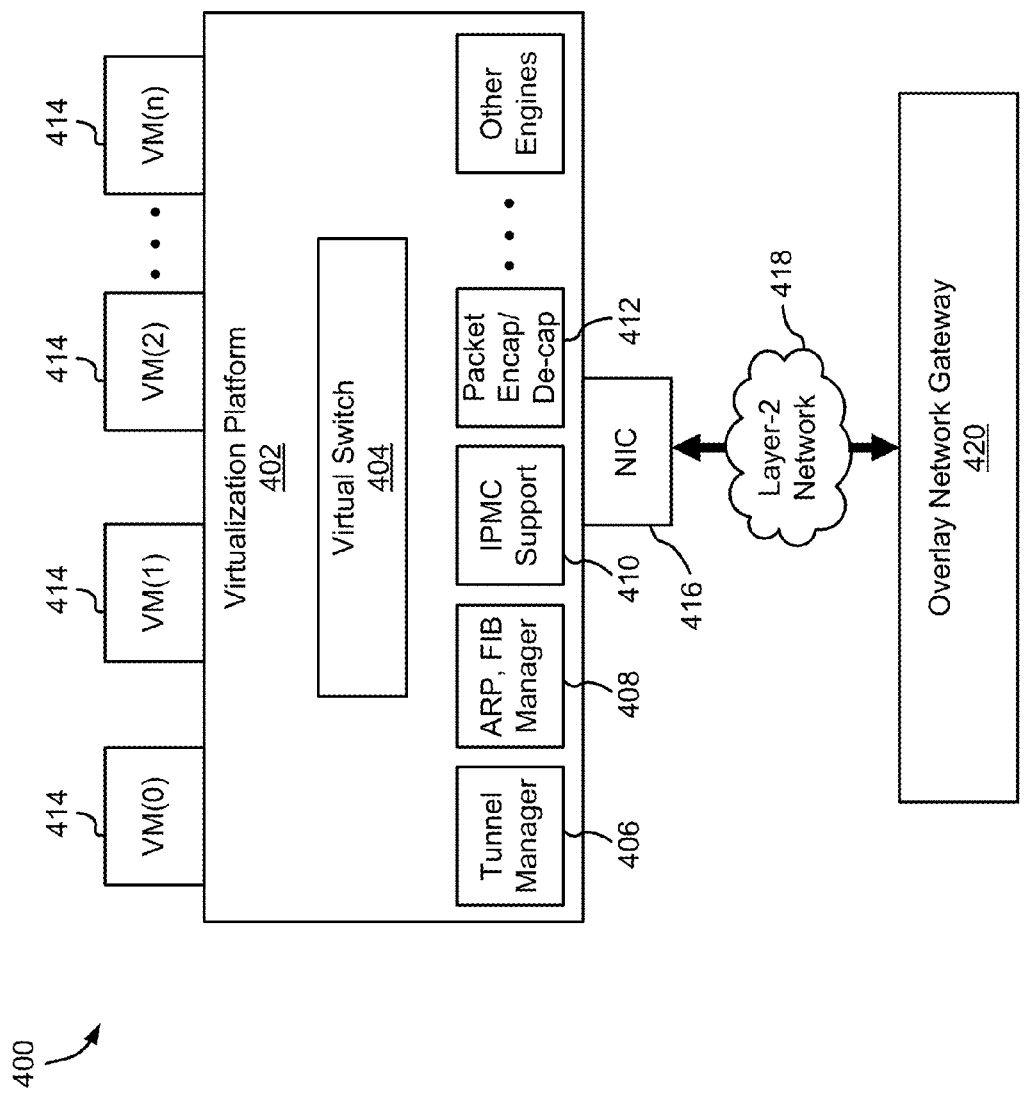
FIG. 4B shows an overlay-capable server connected to an overlay network gateway, according to one approach.

In addition, as shown in FIG. 4B according to one approach, the server 400 includes a physical NIC 416 which manages and provides for communications between a Layer-2 (L2) network 418 and the server 400, in one approach. The NIC 416 includes one or more networking ports adapted for communicating with the L2 network 418 and the server 400. When a packet is encapsulated in an overlay header by the packet encap/de-cap engine 412, the NIC 416 simply passes the packet through to a destination specified in an outer header of the overlay-encapsulated packet. According to one embodiment, In order to bridge between virtualized and non-virtualized networks, the packet may be delivered to an overlay network gateway 420, for further forwarding and/or routing outside of the virtual network in which the server 400 is located.

Figure 5:
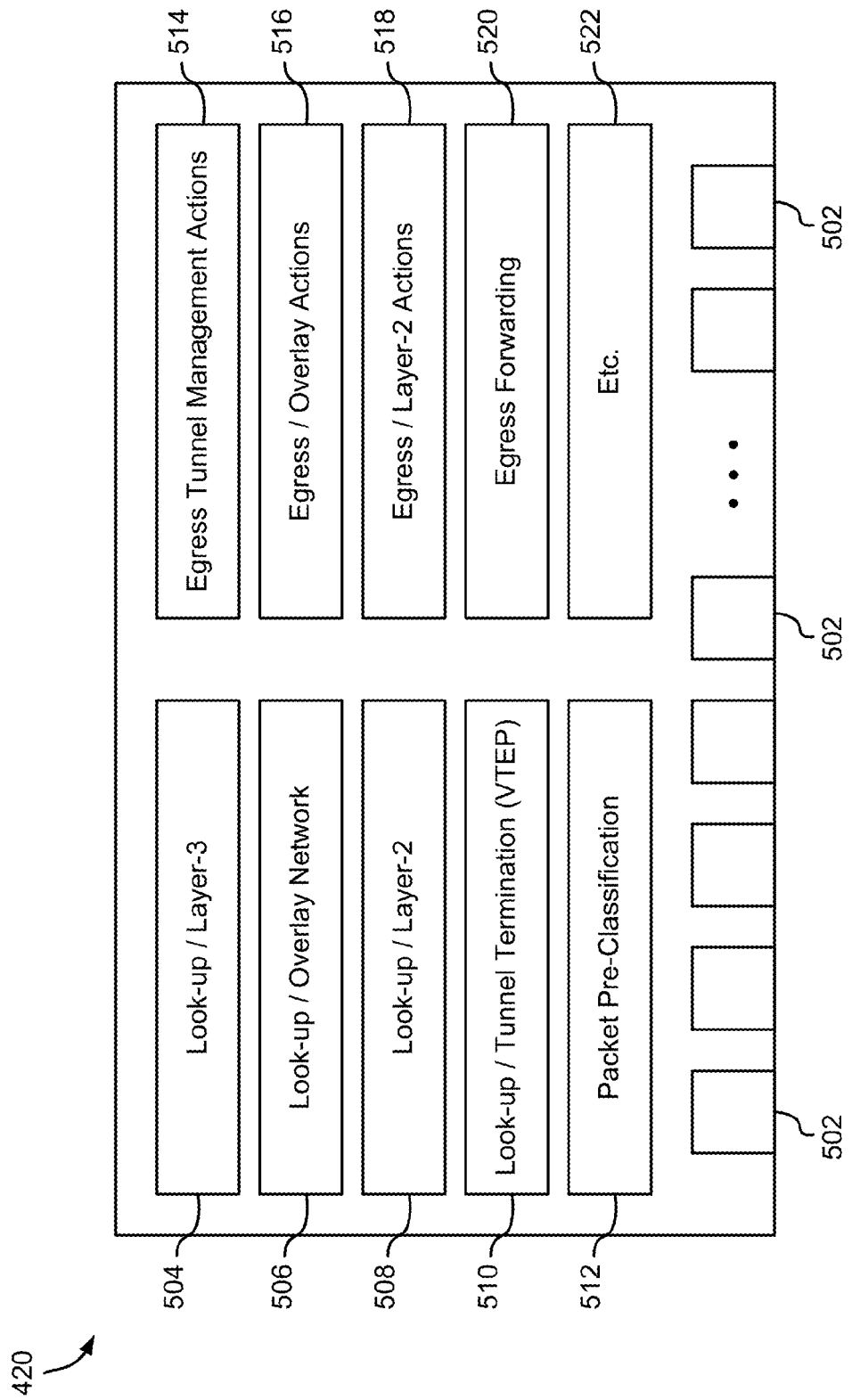
FIG. 5 shows a detailed view of an overlay network gateway, according to one approach.

Referring now to FIG. 5, a detailed view of an overlay network gateway 420 is shown according to one approach. The overlay network gateway 420 comprises a plurality of ports 502 which may be used for packet ingress and/or packet egress. Any number of ports 502 may be present, depending on the arrangement and capabilities of the overlay network gateway 420, such as 16 ports, 32, ports, 64 ports, 128 ports, etc. The overlay network gateway 420 also comprises logic adapted for performing look-ups for L3 addresses and devices 504, logic adapted for performing look-ups for overlay addresses and devices 506, logic adapted for performing look-ups for L2 addresses and devices 508, logic adapted for performing look-ups for tunnel addresses and devices 510, logic adapted for performing packet pre-classification 512, logic adapted for performing egress tunnel management actions (VTEP) 514, logic adapted for performing egress overlay actions 516, logic adapted for performing egress L2 actions 518, logic adapted for performing egress forwarding actions 520, along with possibly other packet functionality 522. Any or all of this logic may be implemented in hardware or software, or a combination thereof. For example, separate modules for each distinct logic block may be implemented in one or more processors, in one embodiment. The processor(s) may include, but are not limited to, an application specific integrated circuit (ASIC), a field programmable gate array (FPGA), a central processing unit (CPU), a microcontroller (MC), a microprocessor, or some other processor known in the art.

In order to increase performance of a virtual networking server using a virtualization platform, overlay network traffic processing may be provided by utilizing a NIC having overlay gateway functionality. Specifically, the NIC having overlay gateway functionality may be adapted for providing some or all functionality of an overlay network gateway, such as managing virtual tunnel end points (VTEPs), address resolution protocol (ARP) cache handling, ARP learning, packet encapsulation and de-capsulation for each overlay network, various look-up functionality for L2, L3, and/or overlay networks, egress packet processing and forwarding, etc. This overlay network gateway functionality may be processed exclusively via the NIC or in combination with other overlay devices, possibly using separate modules and/or processors, and the processed traffic may be delivered to the virtualization platform for final delivery to the appropriate VM(s) or the traffic may be sent down to the network for delivery to a destination VTEP or another IP-based address.

Figure 6:
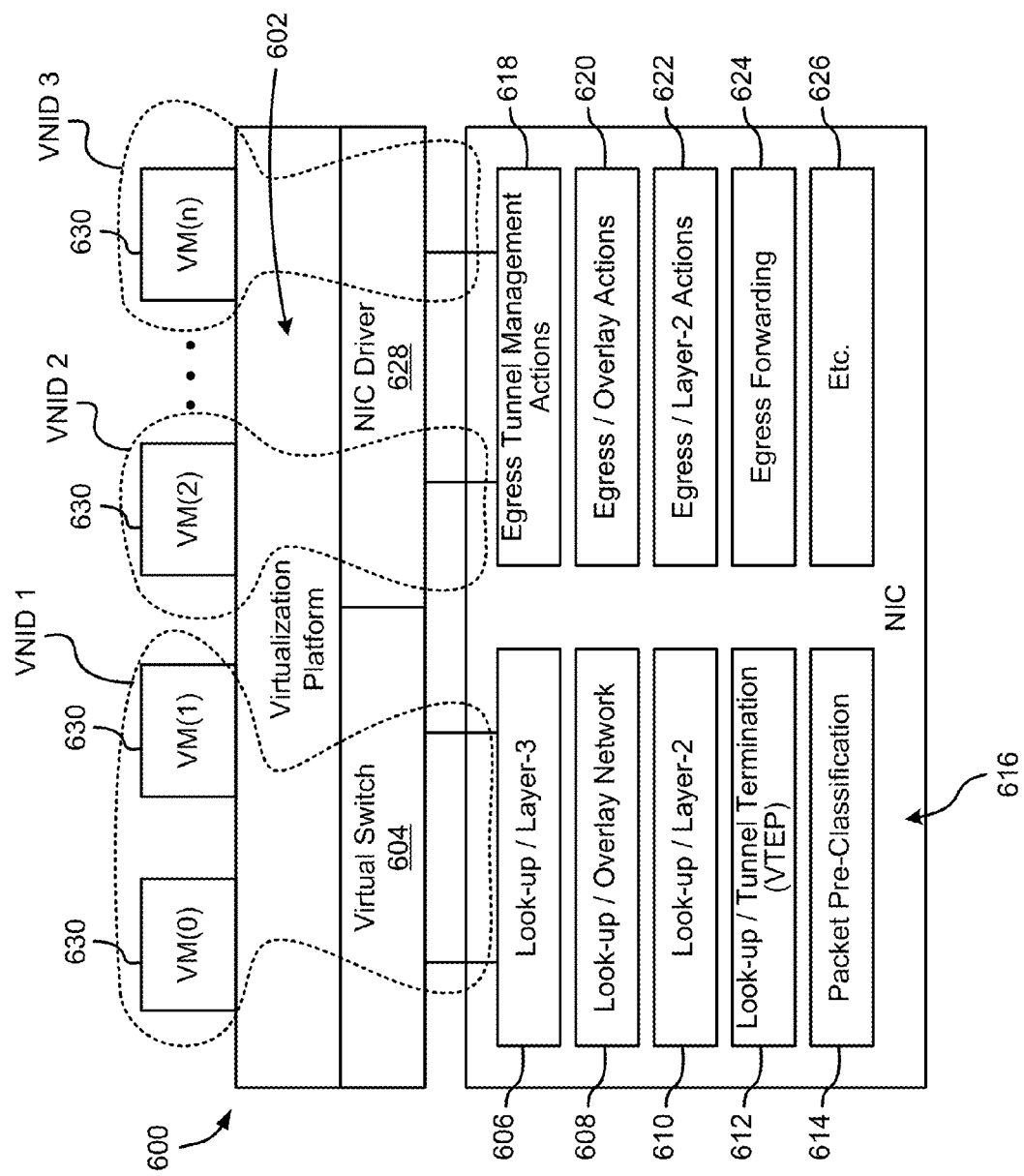
FIG. 6 shows an overlay-capable server using a network interface card (NIC) having overlay gateway functionality, according to one embodiment.

Now referring to FIG. 6, a server 600 using a NIC 616 having overlay network gateway functionality is shown according to another approach. The server 600 also comprises a virtualization platform 602 which provides and manages a virtual switch 604. The virtualization platform 602 also provides support for any number of virtual machines (VMs) 630, shown in FIG. 6 as VM 0, VM 1, VM 2, . . . , VM n. The VMs 630 may be arranged in one or more virtual networks (each virtual network may have a different virtual network identifier (VNID), indicated as VNID 1, VNID 2, VNID 3, etc., in FIG. 6). The number and arrangement of the VMs 630 in the exemplary virtual networks is not meant to be limiting on what configurations are possible, as the Figures only show exemplary arrangements of VMs 630 and virtual networks.

The NIC 616 makes use of one or more processors in order to provide overlay network gateway functionality, such that all overlay network gateway functionality may be offloaded onto the NIC 616, in one embodiment. This overlay network gateway functionality may be embedded as modules within the NIC 616, and may include, but is not limited to, performing look-ups for L3 addresses and devices 606, performing look-ups for overlay addresses and devices 608, performing look-ups for L2 addresses and devices 610, performing look-ups for tunnel addresses and devices 612, performing packet pre-classification 614, performing egress tunnel management actions (VTEP) 618, performing egress overlay actions 620, performing egress L2 actions 622, performing egress forwarding actions 624, along with possibly other packet functionality 626, as well as any other overlay network gateway functionality known in the art.

According to some embodiments, the egress tunnel management actions module 618 may be adapted for providing VTEP origination and termination operations, the various look-up modules 606, 608, 610, and 612 may be adapted for providing look-up operations for packets having an unknown address and forwarding information for packets having a known address, the various egress modules 618, 620, 622, and 624 may be adapted for handling the forwarding and/or sending operations for packets.

In order to provide an interface between the NIC 616 and the virtualization platform 602 in the server 600, a NIC driver 628 may be provided in the server 600 which understands and supports the overlay network gateway functionality that has been provided by the NIC 616, and may manage the NIC 616 accordingly.

In this way, according to one embodiment, in order to adapt a server 600 for use with a different overlay protocol, a NIC driver 628 capable of interfacing with the overlay network protocol supported by an installed NIC 616 having overlay network gateway functionality may be implemented in the server 600. In one non-limiting example, if a server is capable of VXLAN overlay functionality, and this server is to be used in an environment using Microsoft's Hyper-V, an accelerated NIC capable of Hyper-V may be installed in the server, and a NIC driver supporting Hyper-V may be implemented in the server, thereby rendering the server capable of operating in an overlay environment which utilizes Hyper-V as the overlay protocol. One of skill in the art would recognize that this procedure may be used regardless of the overlay protocol.

In one embodiment, if the server 600 already has a NIC driver 628 installed that is capable of supporting a certain overlay protocol, and a NIC 616 having overlay network gateway functionality capable of providing the certain overlay protocol is installed in the server 600, then the NIC 616 may simply be inserted into an available PCIe slot of the server 600, and may operate once installed, in a plug-and-play type arrangement.

Figure 7A:
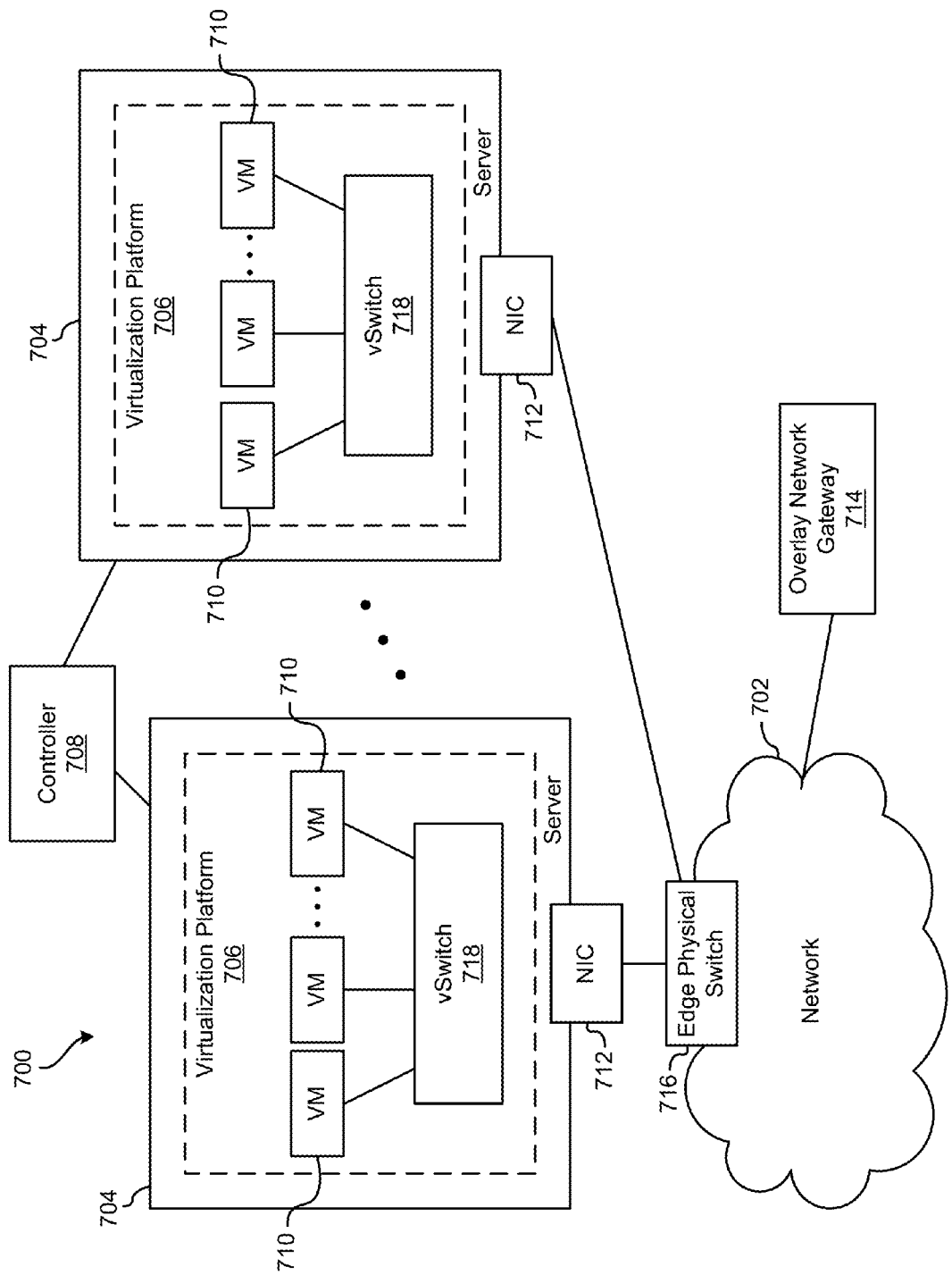
FIG. 7A shows a system for providing overlay functionality, according to one embodiment.

As shown in FIG. 7A, a system 700 is shown according to one embodiment. As shown, the system 700 comprises a server 704 running a virtualization platform 706, and a controller 708 in communication with the server 704. Either or both of the server 704 and/or the controller 708 may be in communication with the network 702, in some approaches. The virtualization platform 706 comprises at least logic adapted for creating one or more VMs 710 and logic adapted for managing a virtual switch (vSwitch) 712. The controller 708 comprises logic adapted for assigning a MAC address and a VLAN ID to each of the one or more VMs 710. Accordingly, a specific tenant to which the one or more VMs belongs may be indicated using a tenant ID derived from the VLAN ID, the MAC address, or a combination thereof.

In one approach, an OUI field in the MAC address may be used as a tenant ID to indicate a specific tenant to which the one or more VMs 710 belongs. That is to say, the OUI is used to distinguish a MAC address as belonging to a particular tenant's VM 710. In other approaches, any combination of the MAC address field and the VLAN ID of an Ethernet packet that is emitted by the virtualization platform 706 on behalf of a VM 710 may be used to derive a tenant ID by a physical switch 716 which receives such a packet. The source OUI is a straight-forward derivative of this broader concept, but is not the only place in the Ethernet packet where the tenant ID may be stored, and later derived.

The controller 708 may be any type of controller which is capable of performing management operations on the server 704 and VMs 710 of the server 704, such as cloud orchestration platform (COP) controller. Particularly, the controller 708 is capable of specifying MAC addresses and VLAN IDs for VM interfaces.

In one approach, in order to provide overlay functionality to a server 704 without modifying existing hardware in a system (which prior to implementation has no overlay functionality or has overlays provided by a virtualization platform 706, a NIC 712, an overlay gateway 714, or a combination thereof), a high level controller 708, such as an IBM® developed Cloud Manager or some other suitable controller, may create VMs 710 on a server 704 and assign the VMs 710 a MAC address from a pool of available MAC addresses. In other words, the controller 708 may create and manage a pool of available MAC addresses with which to assign to VMs 710.

In this approach, any portion of the MAC address, VLAN ID, or a combination thereof may be used to indicate a tenant ID. In particular, the MAC OUI may be used as the tenant ID, and therefore the controller 708 manages a mapping between the tenant and its corresponding unique OUI field value, unique VLAN ID, or combination thereof, which is being used as a tenant ID. That is to say that the controller 708 manages a mapping between each tenant and corresponding identifying information that is used as the tenant ID, such as a unique OUI field value, unique VLAN ID, combination thereof, or some other values from the Ethernet packet.

The controller 708 also controls which VM 710 belongs to which tenant by virtue of having full control over each VM's source MAC address. In other words, each MAC address assigned to a VM 710 includes a OUI prefix which is unique to a specific tenant to which the MAC address belongs when the OUI field value or portion thereof is used to designate the tenant ID.

The controller 708 may perform these tasks without substantial change. In one approach, additional changes to the controller 708 may be that the controller 708 comprises logic adapted for maintaining the mapping between the tenants and portions of their OUIs, VLAN IDs, or combinations thereof, and logic adapted for providing MAC addresses and VLAN IDs to VMs 710 based on which tenant a given VM 710 belongs to. No changes are required to be made to existing virtualization platforms 706, switches, NICs 712, or other associated hardware. This solution makes use of support for basic features that are supported by all virtualization platforms 706 in the industry today, such as application programming interfaces (APIs) that provide an interface for the controller 708 to create VMs 710, assign a MAC address and a VLAN ID to a VM 710, etc.

In another embodiment, the system 700 or any portion thereof (such as the controller 708, the server 704, the virtualization platform 706, etc.) may include logic adapted for providing overlay functionality to packets, logic adapted for using the VLAN ID, a source MAC address, or a combination thereof to derive a tenant ID from a packet for tunnel end point (TEP) operation during encapsulation processing. Furthermore, the logic adapted for providing overlay functionality may be provided by any device capable of providing overlay functionality. According to various embodiments, a NIC 712 within the server 704 may provide overlay functionality, the virtualization platform 706 may provide overlay functionality, and/or a physical switch 716 may provide overlay functionality. The physical switch 716 may be in communication with the server 704 and may be located on an edge of the network 702, thereby providing a VTEP for any overlay traffic directed to or received from the system 700. A device which is located at the edge of the network 702 is a network device which is a closest link to the server 704, e.g., it is a first hop network device from the server 704.

However, in one preferred embodiment, the overlay functionality may be implemented in the edge physical switch 716, with the server 704, virtualization platform 706, NIC 712, and other components being unaware of the network virtualization provided by the edge physical switch 716. Furthermore, this allows the remaining components, other than the edge physical switches 716, to be substantially or completely unmodified while still providing network virtualization.

Accordingly, this solution may be used to bring network virtualization technology to basic vSwitches 718 from any vendor, which can provide significant cost savings for each vSwitch 718, and massive cost savings on a network-wide basis.

Figure 7B:
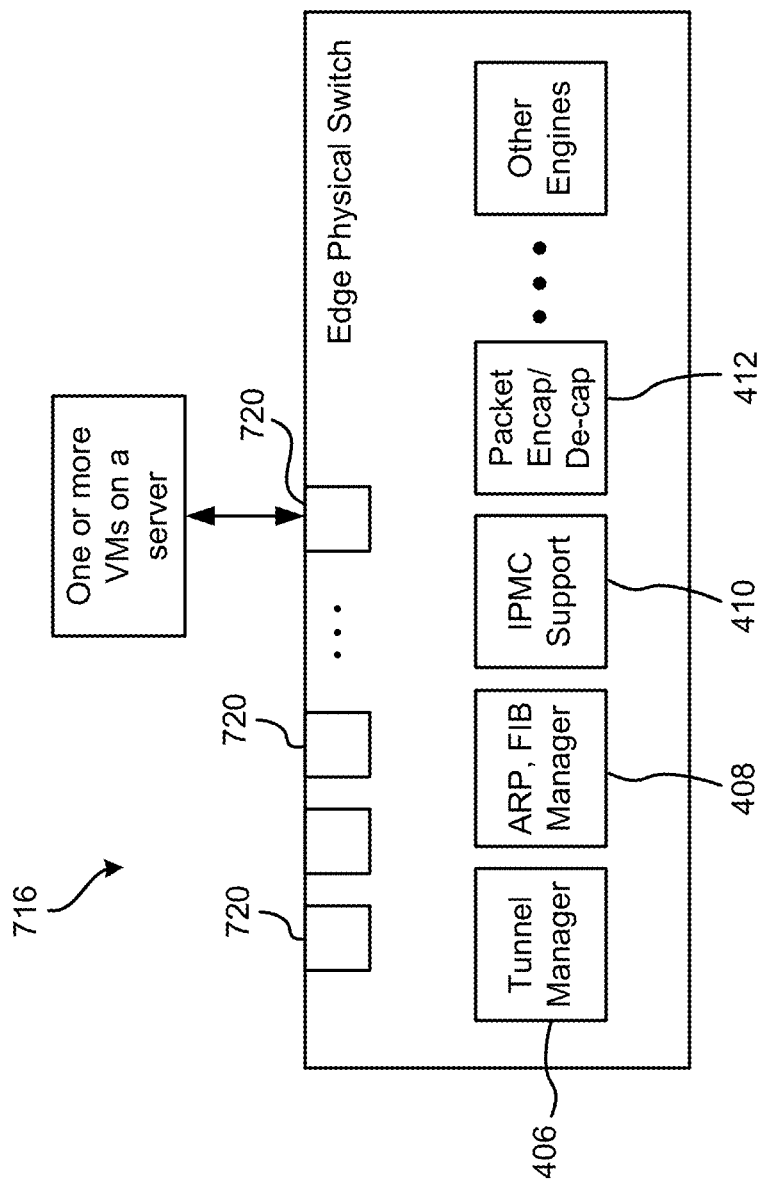
FIG. 7B shows an edge physical switch, according to one embodiment.

Now referring to FIG. 7B, an edge physical switch 716 is shown in more detail, according to one embodiment. As shown, the edge physical switch includes tunnel end point capability, which allows the edge physical switch to terminate and originate tunnels for use in overlay network virtualization. Particularly, some modules are shown, all, some, or none of which may actually be implemented in an edge physical switch, in various approaches. Any modules may be incorporated into an edge physical switch 716, such as a tunnel manager 406, an ARP and FIB manager 408, an engine for providing IPMC support 410, a packet encapsulation and de-capsulation engine 412, and any other overlay-enhancing software engines as known in the art.

On the physical edge switches 716, the following changes may be implemented to allow the network virtualization to be enacted. Instead of using the VLAN ID as a proxy for the Virtual Network Identifier (VNID) (a feature that is being added to hardware by multiple merchant silicon vendors today), the source MAC address or portion thereof, such as the OUI field, the VLAN ID, or some combination thereof may be used for TEP operation at the encapsulation side.

Each edge physical switch 716 also includes one or more ports 720 (such as Ethernet ports) capable of connecting to a variety of devices, networks, servers, controllers, etc. One or more of these ports 720 is connected to a server (and through the server, one or more VMs).

The TEP operates by originating the overlay tunnel for packets from end points (e.g., VMs 710) that are directly connected to a switch's server/downlink ports. In the reverse direction, the TEP terminates the tunnel and delivers the packet to the destination end point. This is standard TEP operation that is being included in hardware by merchant silicon vendors currently. In one approach, since the OUI is used to identify the tenant, the VLAN ID in the packet may be used for "learning" purposes, so that packets sent to the VM from the TEP are tagged appropriately for final delivery.

In another aspect, another mechanism to go along with the technique described above prevents local switching within the virtualization platform 706, which could defeat any tenant/tenant rules present since tenant information is no longer being stored as VLAN IDs. In this embodiment, the system 700 may include logic adapted for preventing local switching within the virtualization platform 706 (thereby reserving full control over network packet processing and policies to the physical switch 716 that implements overlay functionality) by assigning a unique VLAN ID to each VM interface connected to a given vSwitch, such that the given vSwitch is forced to assume that all destinations that a VM 710 attempts to interact with are outside the virtualization platform 706. Preventing local switching within the virtualization platform 706 is advantageous in scenarios where there is a desire to perform more complex traffic engineering or policy enforcement in the network 702 that requires all packet switching to be handled by the external physical switch 716.

In this embodiment, the virtualization platform 706 is unaware of network virtualization, and therefore the virtualization platform 706 is incapable of applying policies to traffic in the virtual network.

To this end, a mechanism where the VLAN ID associated with a VM 710 is not used to group VMs 710 of a given tenant together, but instead serves to prevent local switching within the virtualization platform 706 may be provided. In this embodiment, two VMs 710 belonging to the same tenant may still be allocated different VLANs, but the same MAC OUI. Packets sent from one VM 710 to the another within the same tenant may be sent by the traditional vSwitch 718 to the "uplink," which is connected to the edge physical switch 716. The edge physical switch 716 then performs the TEP operations and sends the packet back to the virtualization platform 706 with a change in the VLAN ID.

An interesting and useful side effect of this mechanism is that since the source MAC OUI includes the tenant ID, there is no need for the encapsulation header to carry the tenant ID, hence there is no need to use another header to carry this information. Eliminating the tenant ID field from the encapsulation header makes it possible to eliminate the UDP header required by current overlay solutions. For example, the tunnel header may include only the outer Ethernet and IP headers, at the minimum. In this embodiment, an overlay encapsulation header for a packet may be created which does not comprise a UDP header when the packet is not locally switched within the virtualization platform 706.

Exiting overlay solutions require the UDP header as part of encapsulation. For an IPv6 case, the UDP checksum is mandatory. Calculating the UDP checksum consumes many cycles or processing, especially ASIC based TEPs which cannot compute the UDP checksum at line rate. According to one embodiment, there is no need to have the UDP header in the encapsulation. Instead, the MAC in IPv6 tunnel may be used to build the overlay network. By avoiding UDP, implementing ASIC-based TEP is much simpler and software based TEPs save processor cycles.

In another approach, another mechanism to go along with the technique described above which prevents local switching within the virtualization platform 706, creates and manages a pool of available VLAN IDs for each vSwitch 718 with which to assign to VMs 710. The controller 708 may maintain a pool of up to approximately 4000 VLAN IDs per vSwitch 718 that the controller 708 is adapted for assigning to VMs 710 which connect to the virtualization platform 706 in such a way that a given VLAN ID is assigned to at most one VM 710. That is to say, a unique VLAN ID is assigned to each VM connected to a vSwitch. In this embodiment, the VLAN ID no longer identifies the network to which a VM 710 connects; instead, it is solely used to prevent local switching such that the external tunnel end point may switch based on policies specified therein.

In this embodiment, each vSwitch 718 is capable of hosting up to about 4000 VMs 710, one for each available unique VLAN ID. The VLAN IDs are locally unique, but are no longer globally unique, which allows any given VLAN ID to be used on each vSwitch 718 without any chance of conflict between their usage.

In a further embodiment, when a VM 710 is migrated from one a first vSwitch 718 to a second vSwitch 718, the first VM's VLAN ID is maintained and a VLAN ID for any VM 710 on the second vSwitch 718 which conflicts with the first VM's VLAN ID is reassigned with disrupting the VMs 710 on the second vSwitch 718. This is a method of handling live migration. When a VM 710 migrates, there may be a need on some virtualization platforms 706 to connect the VM 710 to the same VLAN on the target vSwitch (second vSwitch) as on the source vSwitch (first vSwitch), since the virtualization platforms 706 continues to believe that it is implementing a traditional VLAN scheme. To account for cases where the VLAN ID of a VM 710 is assigned to another VM 710 on the target virtualization platform 706, the VLAN IDs are swapped in a non-intrusive way such that the migrating VM 710 is assigned the VLAN to which it needs to maintain the scheme, and the second VM 710 from which the VLAN was "stolen" is not disrupted in any way.

Solving the problem for multidestination packets (multicast and broadcast) requires additional processing. This is because the layer-2 multicast MAC address is derived based on the layer-3 IP multicast group address, and if this is used unchanged, the packet will not have an OUI in the inner Destination MAC (DMAC) address for the tunnel termination point to use as a tenant ID.

Two solutions are possible for multidestination packet processing, either of which may be used based on the capabilities of the hardware. In a first approach, the tunnel encapsulation point may be used to rewrite the original DMAC address with an address which is constructed from a target OUI and a layer-3 IP multicast destination address included in the packet, with an individual/group (I/G) bit set to "1" (or "0" if that is the proper identifying bit) to indicate that this is a multicast packet. This preserves the OUI/tenant ID lookup semantics at tunnel egress for unicast packets. In this embodiment, the system 700 may include logic adapted for constructing an address from a target OUI and a layer-3 internet protocol (IP) multicast destination address included in a packet, logic adapted for rewriting a destination MAC address in the packet with the constructed address, and logic adapted for setting an I/G bit to indicate multicast packet status.

However, if the network 702 has IP multicast support, then the forwarding entries at the tunnel edge are updated in order to use the new inner DMAC address. In addition, if the packet is destined for more than one target tenant, then the tunnel ingress will make a copy of the packet for each tenant, using the respective OUI to derive the DMAC addresses.

In another approach, the tunnel egress uses the inner source MAC (SMAC) address' OUI to derive the target tenant ID. At this point, communication is possible within a tenant group, but not across tenant groups. For cases where communication between tenant groups (across tenant IDs) is requested, a rule is applied to the egress port to replicate the packet to each target tenant ID. In a sense, this solution shifts the packet replication responsibility to the tunnel egress, instead of the tunnel ingress, as described in the first approach. In this embodiment, the system 700 may include logic adapted for using an OUI from an inner source MAC address to derive a target tenant ID.

Figure 8:
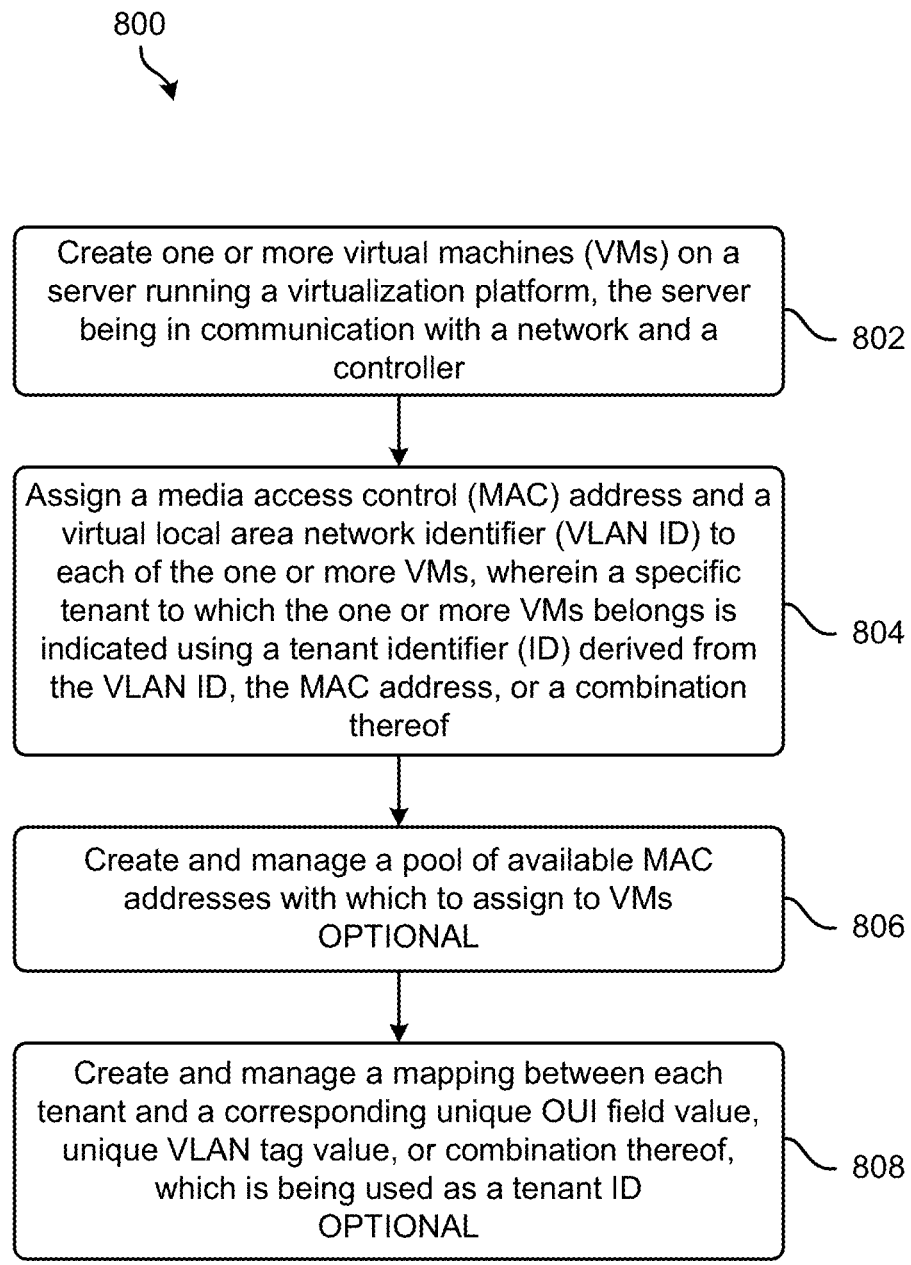
FIG. 8 shows a flowchart of a method, according to one embodiment.

Now referring to FIG. 8, a method 800 for providing overlay functionality in a server is shown according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various non-limiting embodiments, the method 800 may be partially or entirely performed by a controller, a processor (such as a CPU, an ASIC, a FPGA, etc.) which may be embedded in and/or operate within a server, a NIC, or computer program code embedded in a computer readable storage medium within a controller or server, etc.

As shown in FIG. 8, method 800 may initiate with operation 802, where one or more VMs are created on a server running a virtualization platform. The server may be in communication with a network and a controller.

In operation 804, a MAC address is assigned to each of the one or more VMs, wherein a specific tenant to which the one or more VMs belongs is indicated using a tenant ID derived from portions of a VLAN ID, a MAC address, or a combination thereof.

In optional operation 806, a pool of available MAC addresses with which to assign to VMs is created and managed.

In optional operation 808, a mapping between each tenant and a corresponding tenant ID represented by portions of the VLAN ID, the MAC address, or a combination thereof, is created and managed.

Any other embodiment described in relation to system 700 may be included in FIG. 8's method 800 as well, as would be understood b one of skill in the art. Other embodiments described herein may be implemented in the method 800 as well, as would be understood by one of skill in the art upon reading the present descriptions.

According to another embodiment, the method 800 may be embodied as a computer program product for providing overlay functionality to a server. The computer program product may comprise a computer readable storage medium having computer readable program code embodied therewith, the computer readable program code comprising computer readable program code configured for creating one or more VMs on a server running a virtualization platform, the server being in communication with a network and a controller, and computer readable program code configured for assigning a MAC address to each of the one or more VMs, wherein a specific tenant to which the one or more VMs belongs is indicated using a tenant ID derived from a VLAN tag field, an OUI field in the MAC address, or a combination thereof. Other embodiments described herein may be implemented in the computer program product as well, as would be understood by one of skill in the art upon reading the present descriptions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a server running a virtualization platform, the virtualization platform comprising:
logic configured to create one or more virtual machines (VMs);
logic configured to manage a virtual switch (vSwitch); and
a controller in communication with the server, the controller comprising:
logic configured to assign a media access control (MAC) address and a virtual local area network identifier (VLAN ID) to each of the one or more VMs;
logic configured to derive a tenant identifier (ID) for a specific tenant to which the one or more VMs belongs from the MAC address or a combination of the MAC address and the VLAN ID; and
logic configured to indicate each tenant ID using an organizational unique identifier (OUI) field of the MAC address,
wherein each MAC address assigned to a VM includes an OUI prefix which is unique to a specific tenant to which the MAC address belongs.

2. The system as recited in claim 1, wherein the controller is configured to create and manage a pool of available MAC addresses with which to assign to VMs.

3. The system as recited in claim 1, wherein the controller is configured to manage a mapping between each tenant and a corresponding tenant ID represented by portions of the MAC address or a combination of the MAC address and the VLAN ID.

4. The system as recited in claim 1, further comprising:
logic configured to provide overlay functionality to packets; and
logic configured to use the VLAN ID, a source MAC address, or a combination thereof to derive a tenant ID from a packet for tunnel end point (TEP) operation during encapsulation processing.

5. The system as recited in claim 4, wherein the logic configured to provide overlay functionality is provided in at least one of: a network interface card within the server, the virtualization platform, and a physical switch in communication with the server located on an edge of the network.

6. The system as recited in claim 4, further comprising logic configured to prevent local switching within the virtualization platform by assigning a unique VLAN ID to each VM interface connected to a given virtual switch (vSwitch).

7. The system as recited in claim 6, wherein a physical switch external to the server provides overlay functionality for the server, and wherein the physical switch is configured to control network packet processing and policies for the server.

8. The system as recited in claim 6, further comprising logic configured to create and manage a pool of available VLAN IDs for each vSwitch with which to assign to VMs, wherein a unique VLAN ID is assigned to each VM connected to a vSwitch.

9. The system as recited in claim 8, further comprising:
logic configured to receive instruction to migrate a first VM from a first vSwitch on a first server to a second vSwitch on a second server;
logic configured to determine a VLAN ID that is unused on both the first server and the second server; and
logic configured to reassign the first VM's VLAN ID to the available VLAN ID when a VM on the second vSwitch is using the first VM's VLAN ID.

10. The system as recited in claim 4, further comprising:
logic configured to construct an address from a target organizational unique identifier (OUI) field of the MAC address and a layer-3 internet protocol (IP) multicast destination address included in a packet;
logic configured to rewrite a destination MAC address in the packet with the constructed address; and
logic configured to set an individual/group (I/G) bit to indicate multicast packet status.

11. The system as recited in claim 4, further comprising:
logic configured to use an organizational unique identifier (OUI) field from an inner source MAC address to derive a target tenant ID.

12. A method for providing overlay functionality to a server, the method comprising:
creating one or more virtual machines (VMs) on a server running a virtualization platform, the server being in communication with a network and a controller;
assigning a media access control (MAC) address and a virtual local area network identifier (VLAN ID) to each of the one or more VMs;
deriving a tenant identifier (ID) for a specific tenant to which the one or more VMs belongs from the MAC address or a combination of the MAC address and the VLAN ID;
indicating each tenant ID using an organizational unique identifier (OUI) field of the MAC address; and
preventing local switching within the virtualization platform by assigning a unique VLAN ID to each VM interface connected to a given virtual switch (vSwitch),
wherein each MAC address assigned to a VM includes an OUI prefix which is unique to a specific tenant to which the MAC address belongs.

13. The method as recited in claim 12, further comprising:
creating and managing a pool of available MAC addresses with which to assign to VMs; and
creating and managing a mapping between each tenant and a corresponding tenant ID represented by portions of the VLAN ID, the MAC address, or a combination thereof.

14. The method as recited in claim 12, further comprising:
providing overlay functionality to packets; and
using the VLAN ID, a source MAC address, or a combination thereof to derive a tenant ID from a packet for tunnel end point (TEP) operation during encapsulation processing.

15. The method as recited in claim 14, wherein a physical switch that implements overlay functionality for the server controls network packet processing and policies for the server.

16. The method as recited in claim 14, further comprising creating and managing a pool of available VLAN IDs for each vSwitch with which to assign to VMs, wherein a unique VLAN ID is assigned to each VM connected to a vSwitch.

17. The method as recited in claim 16, further comprising:
receiving instruction to migrate a first VM from a first vSwitch on a first server to a second vSwitch on a second server;

determining a VLAN ID that is unused on both the first server and the second server; and reassigning the first VM's VLAN ID to the available VLAN ID when a VM on the second vSwitch is using the first VM's VLAN ID.

18. The method as recited in claim 14, further comprising:

using an organizational unique identifier (OUI) field from an inner source MAC address to derive a target tenant ID;

constructing an address from a target OUI and a layer-3 internet protocol (IP) multicast destination address included in a packet;

rewriting a destination MAC address in the packet with the constructed address; and setting an individual/group (I/G) bit to indicate multicast packet status.

19. A computer program product for providing overlay functionality to a server, the computer program product comprising a computer readable storage medium having computer readable program code embodied therewith, the computer readable program code comprising:

computer readable program code configured for creating one or more virtual machines (VMs) on a server running a virtualization platform, the server being in communication with a network and a controller;

computer readable program code configured for assigning a media access control (MAC) address and a virtual local area network identifier (VLAN ID) to each of the one or more VMs;

computer readable program code configured for deriving a tenant identifier (ID) for a specific tenant to which the one or more VMs belongs from the MAC address or a combination of the MAC address and the VLAN ID; and computer readable program code configured for indicating each tenant ID using an organizational unique identifier (OUI) field of the MAC address, wherein each MAC address assigned to a VM includes an OUI prefix which is unique to a specific tenant to which the MAC address belongs.

20. The computer program product as recited in claim 19, further comprising:

computer readable program code configured for creating and managing a pool of available MAC addresses with which to assign to VMs; and computer readable program code configured for creating and managing a mapping between each tenant and a corresponding tenant ID represented by portions of the VLAN ID, the MAC address, or a combination thereof.

21. The computer program product as recited in claim 19, further comprising:

computer readable program code configured for providing overlay functionality to packets; and computer readable program code configured for using the VLAN ID, a source MAC address, or a combination thereof to derive a tenant ID from a packet for tunnel end point (TEP) operation during encapsulation processing.

22. The computer program product as recited in claim 21, further comprising computer readable program code configured for preventing local switching within the virtualization platform by assigning a unique VLAN ID to each VM interface connected to a given virtual switch (vSwitch).

23. The computer program product as recited in claim 22, further comprising:

computer readable program code configured for using an organizational unique identifier (OUI) field from an inner source MAC address to derive a target tenant ID;

computer readable program code configured for constructing an address from a target OUI and a layer-3 internet protocol (IP) multicast destination address included in a packet;

computer readable program code configured for rewriting a destination MAC address in the packet with the constructed address; and computer readable program code configured for setting an individual/group (I/G) bit to indicate multicast packet status.

\* \* \* \* \*